(12) United States Patent
Bird

(10) Patent No.: US 7,657,545 B2
(45) Date of Patent: Feb. 2, 2010

(54) AUTOMATED APPLICATION DISCOVERY AND ANALYSIS SYSTEM AND METHOD

(75) Inventor: Stephen Anthony Bird, Bensville (AU)

(73) Assignee: Intotality Pty Ltd (AU)

( * ) Notice: Subject to any disclaimer, the term of this patent is extended or adjusted under 35 U.S.C. 154(b) by 19 days.

(21) Appl. No.: 11/224,494

(22) Filed: Sep. 12, 2005

(65) Prior Publication Data
US 2006/0123022 A1 Jun. 8, 2006

Related U.S. Application Data

(63) Continuation of application No. PCT/AU2004/000298, filed on Mar. 12, 2004.

(30) Foreign Application Priority Data
Mar. 12, 2003 (AU) ............................... 2003901152

(51) Int. Cl.
*G06F 7/00* (2006.01)
(52) U.S. Cl. ..................... 707/100; 707/104.1; 715/513
(58) Field of Classification Search .................. None
See application file for complete search history.

(56) References Cited

U.S. PATENT DOCUMENTS

| | | | | |
|---|---|---|---|---|
| 6,236,994 | B1 * | 5/2001 | Swartz et al. ................... | 707/6 |
| 6,311,175 | B1 * | 10/2001 | Adriaans et al. ............... | 706/25 |
| 6,340,977 | B1 * | 1/2002 | Lui et al. ..................... | 715/709 |
| 6,349,404 | B1 * | 2/2002 | Moore et al. ................. | 717/104 |
| 6,907,434 | B2 * | 6/2005 | Maleport et al. .......... | 707/104.1 |
| 7,337,184 | B1 * | 2/2008 | Or et al. ....................... | 707/102 |
| 2002/0013837 | A1 * | 1/2002 | Battat et al. .................. | 709/223 |
| 2002/0129021 | A1 * | 9/2002 | Brown .......................... | 707/10 |
| 2003/0191674 | A1 * | 10/2003 | Hale et al. ...................... | 705/7 |
| 2004/0059812 | A1 * | 3/2004 | Assa .......................... | 709/224 |
| 2004/0068431 | A1 * | 4/2004 | Smith et al. .................... | 705/10 |
| 2004/0215599 | A1 * | 10/2004 | Apps et al. ..................... | 707/2 |
| 2005/0256787 | A1 * | 11/2005 | Wadawadigi et al. .......... | 705/28 |

FOREIGN PATENT DOCUMENTS

WO WO 2004081827 A1 * 9/2004

* cited by examiner

*Primary Examiner*—Don Wong
*Assistant Examiner*—Shyue Jiunn Hwa
(74) *Attorney, Agent, or Firm*—St. Onge Steward Johnston & Reens LLC

(57) ABSTRACT

An object oriented design for an automated modeling system for mapping and monitoring the business roles and impact of elements within an IT Infrastructure that make up specific applications or business processes, spanning not only network elements, hosts, servers and programs but also users, company structure and processes. The design including: a series of collector modules for collecting relationship, modeling and status information from both IT and external non IT specific sources used to build a model of the application or process in the database and to gather data about activities occurring on the computer network from a business impact perspective; a series of visualizer modules for reporting monitoring activities conducted by the monitoring system; a modeling database for storing information collected by the collector modules; a series of correlator modules for automatically determining relationships between data objects stored in the database to build application models of individual applications in the context of business process and IT service delivery.

19 Claims, 11 Drawing Sheets

AUTOMATED APPLICATION DISCOVERY AND ANALYSIS SYSTEM AND METHOD

This application is a continuation of pending International Patent Application No. PCT/AU2004/000298 filed on Mar. 12, 2004, which designates the United States and claims priority of Australian Patent Application No. 2003901152 filed on Mar. 12, 2003.

FIELD OF THE INVENTION

The present invention relates to the field of information systems monitoring, and in particular, discloses a system for automatic discovery, modeling and monitoring of IT based business applications and the IT infrastructure elements that support them from the perspective of business impact.

BACKGROUND OF THE INVENTION

Over the last two decades the Information Technology (IT) industry has moved from providing dedicated and relatively low impact solutions to complex multi-vendor systems that permeate all levels of every company's infrastructure. If an IT asset or system fails it may have a direct impact on a company's ability to function, for a trading room no shares can be traded, for an airline no seats sold and for a retail organization sales lost.

As IT has grown in importance to business, the role of IT management systems has evolved from simple technical tools utilized by engineers to remote control hardware to applications used by business managers attempting to understand the cost and impact of IT or more specifically the failure of IT on their business. The problem is that these tools are complex, expensive and may not be of great use.

Even though the configuration of IT management systems require large amounts of effort, the importance of IT management systems continue to grow for most medium to large business. This results in large resource expenditures to try to reduce IT operating costs and in gaining understanding of IT's role and impact on their business.

Referring to FIG. 1, existing IT Management technologies tend to look the management of IT from the perspective of individual technology verticals, whilst the application crosses all disciplines.

Current IT Management technologies are unable to map application end to end and specifically fail to be able to discover which IT element supports each application.

As businesses have attempted to utilize IT management systems for more complex business and application management they have discovered that this is a very manual process, involving constant maintenance and complex programming. The large cost of support and the product restrictions they encounter makes the task of getting the system running in any meaningful way, difficult with high costs. Data is manually entered and is often out of date before going into production. Critically the data required to program the IT elements that make up each application is often not known, hence the requirement for auto discovery of the elements that make up each application.

Business managers are often asking for more and more automated mapping of their service and business application environment. Existing technologies are aimed at modeling the IT infrastructure from a connectivity point of view rather than mapping the business application or processes from the user to the application(s) they are accessing and showing the impact of an IT resource failure from business impact perspective utilizing an automatically maintained application model as a reference.

SUMMARY OF THE INVENTION

It is an object of the present invention to provide mechanism and methodology that enable the substantially automatic discovery of business application and the IT elements that support them.

From this, the system will be able to determine the role of each IT element in supporting the business and provide detail impact analysis from a business perspective from the failure of an IT element.

This impact will be measured from multiple perspectives including: The impacted applications; impacted users; and financial impact on the business.

In accordance with a first aspect of the present invention, there is provided a computer system for discovery, modeling and monitoring system applications and the supporting IT infrastructure in a computer network The preferred embodiment of the design includes: a series of collector modules for collecting relationship and status information about the IT elements from traditional IT perspectives and from non traditional sources of IT modeling information (i.e HR, LDAP and Asset Systems). The collected data is converted to a common data structure by the collectors; a series of visualizer modules for reporting on application data, activity and business impact; a modeling database for storing information collected by the collector modules; a series of correlator modules for determining correlations and relationships between data and IT elements models stored in the database, in effect creating the application models and business relationships.

The output of the correlations is viewed by the Visualizer modules, typically via a browser based graphical user interface. The system could operate via a publish and subscribe data bus typically using a bus broker for arbitrating access by the other modules to this information, this part of the architecture can also be provided by a third party system, as it is a method of communication with in the system, rather than a method of modeling data. The system can also include a second database structure for storing statistical information collected by the correlations between data in the modeling database.

The system is scalable and embodies the concept of the Virtual Server Architecture which enables the system to be distributed over a large number of geographically disparate computer systems, yet appear as a single application and data model.

In accordance with a further aspect of the present invention, there is provided a monitoring system for gathering data from a computer network, the system including: a series of collector modules, connected to network devices for collecting status information about activities occurring on the computer network; a series of Visualizer modules, for reporting against monitoring activities conducted by the monitoring system; a database for storing the information collected by the collector modules; a series of correlator modules for determining correlations and relationships between data and IT element models stored in the database, mapping the monitoring data to the elements in each application model. The network modeling component of the solution can utilize a third party application to provide some of the data, this would be incorporated into the overall business application models.

BRIEF DESCRIPTION OF THE DRAWINGS

Preferred forms of the present invention will now be described with reference to the accompanying drawings in which.

DESCRIPTION OF INVENTION AND PREFERRED EMBODIMENTS

Figure 1:
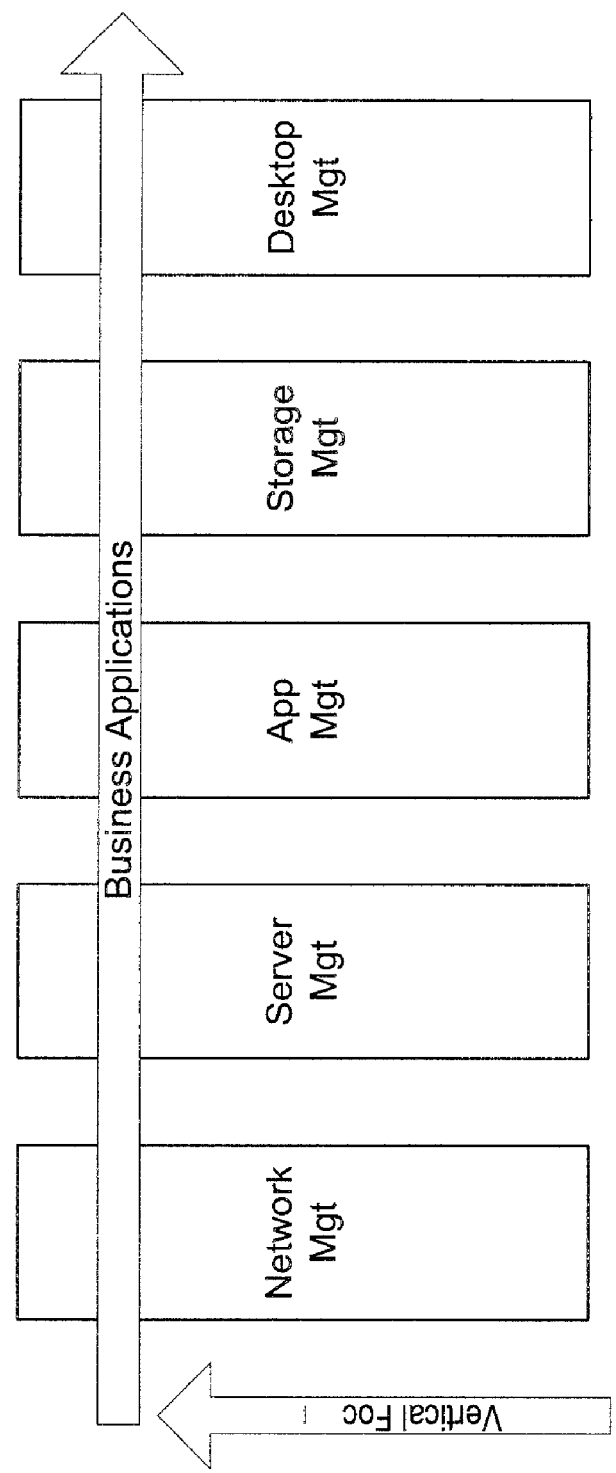
FIG. 1 show's the relationship if IT management disciplines to the actual business applications, most technologies manage vertically, whilst the target application cut across all disciplines horizontally from the perspective of the business.

The preferred embodiment provides for an informative application for business management. An example would be stating that "the web page is down," or "the share trading system is unavailable", as opposed to "router xxx.customer-.com has failed". The differentiator includes mapping the web system or trading floors IT Elements components and their relationships automatically.

The technology described in this application provides the ability to not only automatically discover and maintain a model of each business application end to end, but incorporate data from each IT management vertical and non-IT data into one application model.

Once an application model is automatically generated and maintained a wide range of application can be generated including "What if?" analysis, risk management, prioritization of incident resolution based on business impact, service delivery reporting based on real world impact data and resource planning.

Initially, the preferred embodiment will be discussed by way of a methodology example.

Methodology Example

The following is an example of application discovery using Service Modeler Methodology, it is not intended to cover all of the complexities of the inter application communication; rather provide a summary of the over all process.

To discover the application Greentree Accounting with Service Modeler we would need to first define the policies that could be used to describe the elements that make up this application, they are:
All PC's with greentree.exe loaded
All Servers with GreentreeServer.exe loaded
Any SQL databases accessed by the Server process or named *greentree*
Any user who uses the PC's discovered
Any business unit these staff are assigned to
Any network infrastructure that connects the discovered elements together Based on these policies Service Modeler will be able to discover and maintain a model of the Greentree Accounting application. The key point with the policies is that they are non-specific, the more policies and data points the more accurate the model of the application. Basic policies can be deployed initially, with additional policies added over time to refine the model as exceptions or improvements are identified.

Once the policies have been defined, the collectors required for gathering the data can be identified; in this case the following are required.
Software inventory collector, installed software
LDAP (a directory services protocol that controls user access to computer systems) Collector, system and user data
SQL Collectors, for HR Database and SQL Server data
Physical network discovery or Network Management Systems (NMS) integration
Traffic probing is an option for detailed inter application communication.

Correlators are then programmed via a GUI to instruct the respective Collectors to gather the data required and to build the model of the application.

The software inventory Collector can identify all of the PC workstations with the greentree.exe software loaded, and create models for these systems in the modeling engine. This list of systems is used by the LDAP collector to identify both a list of users that use these systems and any other information about them. The user models are created in the data model and associated with the PC's. Details such as email address, phone number, domain membership etc will be added to the models via the LDAP Collector.

The user list will then be used by the SQL Collector to access the HR database to add user details, address, position, role, manager, business unit etc.

The software inventory collector can also identify the Servers with Greentreeserver.exe loaded and any SQL databases either named as part of greentree databases or accessed by greentree server process users. Traffic probes and/or client agents (Client Agents are software agents that would be loaded onto each end user computer system and server, they would collect data on activity, installed software or any other metric that could assist in building the application models) can also be used to map inter-server communications to discover more complex relationships.

The Service Modeler now has identified the application endpoints in the Greentree Accounting application. Following this the network discovery Collector can utilize OSI layer two and network discovery techniques to map the network infrastructure (this could also be imported from a third party application). This process would generally be completed as part of an initial system setup, rather than for a specific application discovery. This process identifies the supporting connection points for all of the application elements, creating an end to end map of the application elements utilized by Greentree Accounting, this includes all:
application components, workstations, servers and database servers.
users of the application, including their role, manager and business units.
IT infrastructure, including redundant paths.

As other applications are discovered this can form a three dimensional map of the enterprise identifying the multiple roles of each IT element, which users utilize which applications, who has which applications installed etc.

If an IT device fails, physical connectivity based root-cause analysis can be used to suppress the symptomatic alarms. With the offending element identified users will be able to clearly see which applications or businesses it supports and the impact in terms of impacted elements on each individual application.

Visualizers provide the structure and mechanism to display this data in meaningful formats and context for different user types, for example:

The business manager will want a dashboard showing the health of key business applications mapped against business KPI's. Technical staff will need to know the impact of a fault on the business, and allow them to prioritize repairs.

IT managers or outsourcers will want to understand their compliance to service levels and contractual obligations.

Preconfigured Modules

Many applications are common to most businesses, for example Exchange and Oracle, for these a set of Correlator/Collector bundles including base policies can be produced as a preconfigured bundle.

Non-IT Data Integration

The integration of non-IT data provides a new perspective, as business units or processes are modeled these can be augmented with real-time monitoring of business KPI's, i.e. the number of boxes shipped, calls received, units sold, telemarketing revenue etc.

When an issue occurs it can be mapped against actual business KPI's, meaning for example, an incident occurring that impacts the business can be clearly seen by comparing service availability to business performance, i.e. the number of web based transactions having a sudden decrease in volume, in parallel with an application failure would have a higher priority to one that has no apparent business impact. This data will be integrated from business applications such as (CRM) Customer Relationship Management, (ERP) Enterprise Resource Planning, Shipping, Financial Systems, etc.

Service Level Management

Service Level Agreement (SLA) and service delivery measurement can be provided in real time based on the current state of IT elements, providing a proactive warning of where an IT issue is impacting service delivery or an SLA is at risk.

The mapping of business KPI's, costing and impacted staff, provides the structure for very accurate and real time service delivery measurement, providing up to the minute costing of the financial impact of failure.

The monitoring of which applications are used by individuals can allow the impact of failures over time to be reported against from an individual perspective, that is the amount of time an individual or group of individuals were unproductive due to application outages. This can be correlated against staff costs and revenue figures to determine the cost of the outage in real terms.

What if? Impact Prediction

The data models in Service Modeler understand all of the IT elements that each application is comprised of. This information is then used for impact prediction, simulations of failure scenarios such as "if we loose this router what applications can be impacted".

Application Discovery Methodology

Figure 2:
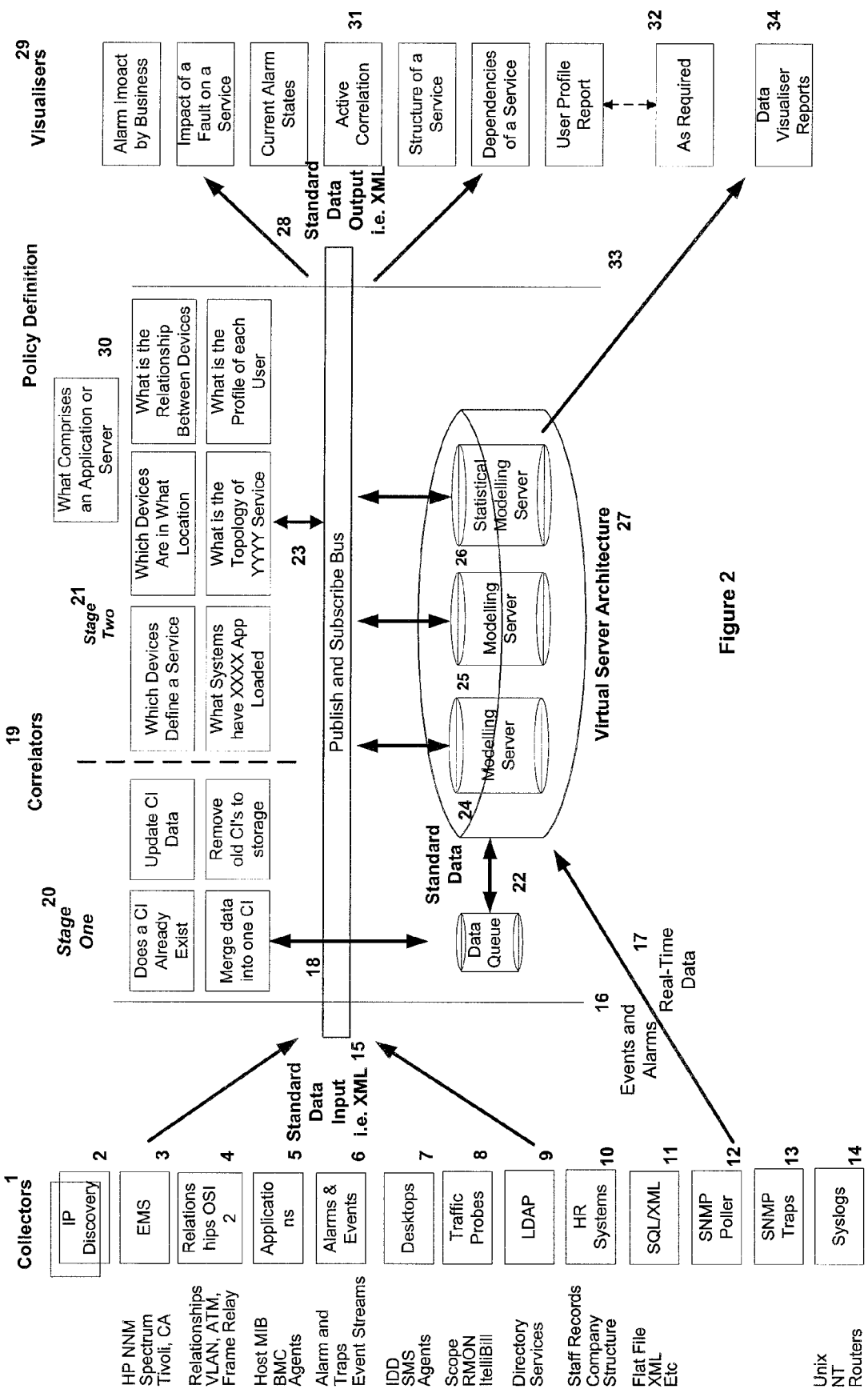
FIG. 2 illustrates the object model arrangement of the preferred embodiment.

A block diagram of the Application discovery system in accordance with the current invention is shown in FIG. 2.

The Automated Application Discovery and Analysis System consists of a series of components that support the Methodology for discovering which IT elements within an IT infrastructure support each business process and application. The objective is to automatically determine which application and processes are supported by each IT element, so that when an IT element fails administrators will be proactively informed on the business impact of the failure.

The components of the preferred embodiment are:
Collectors
Services and Daemon
Desktop and Server agents
Correlators
Phase 1
Phase 2
Data Model
Visualizers Principal concepts in the Methodology are:
Common data format
IT vs. Non-IT data Sources
Policy definition
Application Models
Application Auto-Discovery
Business Structure Modeling
Business application impact These components and methodologies are described hereinafter.

The application discovery methodology is based on collecting a wide range of disparate data sources and then combining this data together based on user defined policies to build models of application and their relationship within a business context.

Using policies to define which IT elements make up an application removes the requirement for a detail understanding of what IT elements make up an IT Infrastructure that supports an application. Rather only a broad understanding of the application is required from which the application modeling system will build the application model.

As shown in FIG. 2, there are various sources of data 2-14 available for application discovery by collectors 1. These can be IT oriented data, such as installed software or hardware configuration data, or non-IT data sources such as human resource (HR) data such as organizational charts, financial information etc. Data from the data types is collected by Collectors which transform the collected data into a common data format (e.g. XML) for insertion into the data model by the phase 1 Correlators 19. The Collectors are generally written specifically to gather data from a specific Data Type. The type and amount of data collected by the Collectors is specified by the Correlators 19 such that they only collect the data required to build the application models, in effect the collectors and Correlators can operate in pairs. The data from the Collectors is taken by the phase one Correlators 20 and added to models in the database 27. The phase one Correlators gather the data and then check to see if an object for that particular data already exists in the data model, if so the data is added to the object or used to update existing data in the object. If an object for the data does not exist, the Correlator creates a new object and then adds the data. Objects for IT elements are created from multiple data sources. An example would be a model of a desktop system which would consist of hardware data, software data, location data, each from a separate data source and Collector 1. Objects in the Data Model include users; these objects would also be built from multiple data sources such as LDAP and HR data bases.

The Database 27 is populated with data objects that represent all of the components of multiple applications, the data collected to build the objects was specified to the Collectors by the phase two Correlators 21. The phase two Correlators sort and manipulate the objects in the database to create relationships that become application models (8, 9, 10, 11). The data modeling structures is described in FIG. 3.

Phase two Correlators are configured with policies via a graphical user interface 136 that define the application models. These policies in turn describe relationships between elements, i.e. comparing the user name in a model for a user and comparing that to the primary user of a desktop system and creating a relationship that that user typically uses that workstation.

Policies generally describe an application such as:

All PC's with XYZ software installed,

All the IT Infrastructure that connects those system together,

Any other applications that a given process on a server communicates with.

An example of this is detailed in the methodology example earlier in this document.

The Application models are dynamically created and updated as new data is added to the model and the policies that define the model are refined. This is a self maintaining process as the collectors continually collect new data which is added to the object store by the phase one collectors. Phase two Collectors can then be based on their policies and update the application models without administrative interaction.

For example, if a new user for an application is added to the IT infrastructure, the respective collector can add that users' data to the data model via the phase one correlator. The phase two correlator will then add that user to the application models in which they participate.

Visualizers 135 are applications that utilize the data store and the application models within it to display relevant and in context information to users of the system. The Visualizer applications are accessed via the GUI (136) and can include:

maps of the applications,

What if? scenarios (simulations), application status information, business impact reports, Event notification and other roles.

The scope of the visualizers is extensible, allowing for applications that use the data models to be created as required, and to address specific issues.

Components of Preferred Embodiment

FIG. 2 illustrates an overall system diagram of the "Service Modeler" of the preferred embodiment. All functionality of the methodology describe above applies to this application.

Collectors

Collectors (1-14) within the Service Modeler collect data from a range of sources, both IT and non-IT, and then convert (normalise) this data to a common XML data format compatible with the XML data Model. Under the Service Modeler architecture, the Collectors gather data from a wide range of data sources, much more so than traditional management tools. The collected data is transformed by the Collector into a standard XML input API schema.

This data is then passed to one or more Service Modeler databases (24,25) where Correlators (19-21) take this data and build XML based models of the applications and the business environment. Correlators and Collectors operate as pairs, where policies are defined for the Correlators via a GUI which describes an application or business environment; these policies in turn automatically configure the Collectors to collect the required data on which to base the application discovery process. Correlators use the collected data to determine relationships between the IT elements and from this, automatically map the physical and logical topology of the application.

Collectors will take two specific forms being Services/Daemon's or Desktop and Server agents. Services/Daemons are processes written to collect and normalise data from a specific application. Services apply to Microsoft based systems and Daemons apply to UNIX based systems. An example of this functionality is an SQL collector (11) which would connect to a database (i.e. MSSQL or Oracle) and collect SQL data, mapping this data to an XML schema. Other Collectors operate is a similar manor such as the LDAP collector that would map user and account data to an XML schema.

Agent based collectors (7) are more generic that the Service/Daemon collectors being able to collect a broader spectrum of data in one process. These can initially be install on all end user systems and can be used to collect data such as:

Installed software

Active applications

Hardware configuration

Current user

Network activity

Collectors can be configured by the Correlators, such that when a policy is configured the affected Correlator will make a request of the appropriate Collector(s) to gather the required data. An example of this would be configuring a policy that adds any system with greentree.exe installed to the Greentree accounting application model. Once this policy is configured in a Correlator that Correlator will issue a request to the appropriate Collector to gather this information; the agent Collectors that detect Greentree.exe would add this data to their XML output for incorporation into the data model. Whilst a service/daemon collector would add greentree.exe to its scan of a software inventory database (I.e. SMS) and produce a list of systems that have greentree.exe installed which would then be incorporated into the data model.

The number and type of Collectors can vary with each implementation. They can be added dynamically as required to add new data sources to the model. As new collectors are added the resolution and accuracy of the Application Models is often enhanced.

Collectors can also collect real time event data such as SNMP traps and SYSLOG events (13,14) and map this data against the status of the data objects in the model, when this is combined with polling for availability (12) of each object. The Service Modeler can then determine which applications are impacted by failures in the IT infrastructure. These events can then be sorted to determine the root cause, either using the Correlator technique or external root cause analysis technologies such a code boot correlation.

Correlators

Correlators define the policies used to discover the application structure and create the Application models—they both configure the Collectors to gather the required information and manipulate data in the XML data Model to build Application Models.

Correlators can request information based on a policy as well subscribe to data being published by Collectors, other Correlators or Modeler databases. This is conducted in a highly scalable and flexible environment, through which the addition of additional Service Modeler data stores in effect extends the capabilities of the system as a whole. The Correlators also build connectivity based XML models of network topologies, against which Root Cause Analysis solutions can be applied.

There are two types of Correlators, Phase 1 and Phase 2.

Phase 1 Correlators (20) are used to take the data collected from the Collectors and add that data to the data models. These Correlators do not build application models themselves, rather they build the objects from with the application models are built. As data is collected from the Collectors it is place in the Data queue (22). This queue is a holding area for data waiting to be processed by the phase one Correlators. Data at the stage is in a common format (15), in this case XML, although this could be varied within other embodiments of the methodology. As phase one Correlators process a piece of data, they first check to see which model for the object relating to the piece of data exists. If the object exists, they add the data to the existing model, updating older data in the process if required. If an object doesn't exist the Correlator creates a new object and then add the data to it.

Phase one Correlators tend to have reasonably static configurations being concerned with sorting data.

Data Objects created in the database are called IT Elements represent components of the real world IT infrastructure. The IT Elements can be constructed of Element Components which are typically created from several data sources. i.e. an IT Element representing a PC would be build from hardware inventory data, software inventory data and LDAP information.

At the end of the phase 1 process the objects required to build the application model are in the database with all of the data from the various Collectors, integrated into data object models, but the relationships between them have not been established.

Data collected for status monitoring (12,13,14) is applied to the objects modelled by phase 1 Correlators and is used to map the impact of a failure against data objects, which are then mapped against application models created by phase two Correlators. The priority of mapping this type of data can be set higher than data for building objects, ensuring timely indication of faults and their impact. This process can also be treated as a separate thread into the data model to ensure that collection of status and event data does not impact on each other unnecessarily.

Phase 2 Correlators (21) are configured via a policy definition (30) to sort the data object in the database to build application models. These Correlators tend to be dynamic in configuration and number of instance, their role being defined by the policies configured into the system.

In the example of discovery the Greentree Accounting application with Service Modeler, as noted previously an administrator would need to first define the policies that could be used to describe the elements that make up this application. These can include:

All PC's with greentree.exe loaded
All Servers with GreentreeServer.exe loaded
Any SQL databases accessed by the Server process or named *greentree*
Any user who uses the PC's discovered
Any business unit these staff are assigned to
Any network infrastructure that connects the discovered elements together The key point with the policies is that they are non-specific, the more policies and data points, the more accurate the model of the application is likely to be. Basic policies can be deployed initially, with additional policies added over time to refine the model as exceptions or improvements are identified. Correlators are configured to discover and map relationships between the data models in the database to build the application model.

Once the policies have been defined, the collectors required for gathering the data can be identified and configured. In this case the following Collectors are required.

Software inventory collector, installed software
LDAP Collector, system and user data
SQL Collectors, for HR Database and SQL Server data
Physical network discovery or NMS integration The Correlators are configured as part of the policy definition. The part of the XML data object they need to scan to identify components of the application that they are tasked with identifying. As the components are identified they are tagged as part of that application, these tags are then used to build the end to end view of the application, with each object being both tagged as part of an application model and with its relationship to its adjoining objects being added within the data objects themselves.

Objects can be members of multiple application models. By looking at the tags within the object, it is easily recognizable which applications each object supports, allowing the Visualizers to query each object efficiently for its role in the IT environment.

Additionally building end to end application maps involves selecting a starting point and then expanding the objects in the map a steps at a time. As the map is expanded the objects related to the outside object can be added to the map increasing the number of objects, with the new object becoming the output parameter of the map.

It is also allowable for one correlator to select a group of objects under its criteria and have another then exclude objects from that subset based on other criteria.

Correlators request data from the distributed Modeling server databases (24,25) via the Publish and Subscribe bus (18,23). As Correlators collect data, they subscribe to the bus for they type of information they require and, as data is added to the modeling server, this data is published to subscribers for use in building models.

The discovery of business relationships in no different to connectivity relationships as the data is normalized at the Collector stage of the methodology. From a mapping point of view, the business relationships can be used to form a map based on business topology rather than connectivity relationships.

Data Model

The Data Model, in which the application models are created, is created in a distributed database structure as described in the Virtual Server Architecture (27). The Virtual Server architecture consists of several Modeling servers (24, 25) which are instances of the Modeling Database communicating between each other in a publish and subscribe fashion to create a virtual data store.

The Virtual Modeling database can allocate modeling tasks between modeling servers in a distributed environment, sharing the load between them. When capacity needs to be increased a Modeling server can be added that extends the capacity of the database dynamically rather than creating another management domain.

Virtual Server Architecture

Given that business applications often span large enterprises it is desirable that the Service Modeler 24, 25 has an extensible and scalable architecture scaling to many underlying distributed modeling servers yet appearing as one single environment to enable end to end application views.

Where instead of introducing a new management domain when a new Server is added it will instead increase the virtual capacity of a single virtual server.

The Service Modelers 24, 25 act to distribute the modeling between the two systems and the overall capacity of the system can be increased.

Service Modeler databases can operate individually or in a distributed publish and subscribe environment, even the Service Modeler is a data source for the Correlators.

Redundancy and fault tolerance for the Service Modeler can function in the same way, with additional Modeling Servers being added to the fabric and replicating the data such that the failure of one Modeling Server will not result in the loss of data or modeling functionality. The Correlators are independent of the Data Modeling servers and can access and be accessed by multiple Data Modeling Servers via the publish and subscribe bus environment.

For the Service Modeler preferred embodiment of the invention, XML has been chosen as the language of choice for building the data model. This can be replaced by other languages or technologies as deemed necessary without impacted the methodology.

(XML) Extensible Mark-up Language is a standardized text format specially designed for transmitting structured data to applications. This new language addresses the needs of programmers who encounter limitations in the ability of other languages to express structured data. XML differs from other languages in three basic ways:

- Information providers can define new tag and attribute names at will.
- Document structures can be nested to any level of complexity.
- Any XML document can contain an optional description of its grammar for use by applications that need to perform structural validation.

XML has been designed for maximum expressive power and maximum ease of implementation. Progress with the Data Visualizer indicates that XML is ideal for developing Service Modeler, as it is required to collect data from a very broad range of sources. By converting this data to XML and inserting it into the application models, Service Modeler only has to deal with one data format (XML) internally making it much more efficient and reducing internal complexity. As the components of an application are discovered they can be incorporated into an XML database. Within this database, a Data Modeling environment can be built to incorporate both IT and non-IT data to model applications end-to-end. The data model can include not only the IT elements, but the users, business units, processes and service models. These will be combined with business KPI's to provide a real time model of service delivery, against which problems in the IT environment can be compared to, to determine the actual or possible impact on the business.

Figure 3:
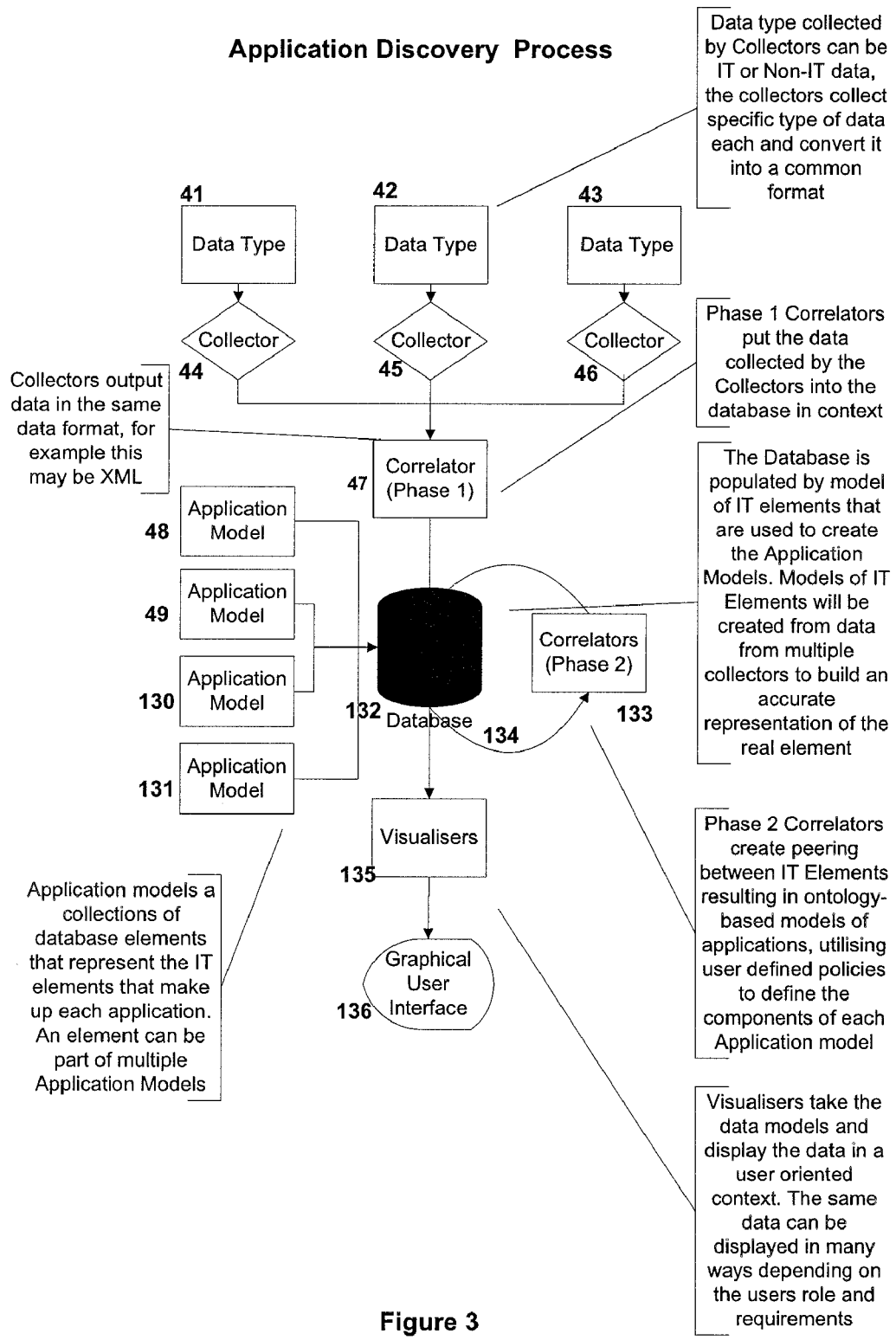
FIG. 3 illustrates the basic process of application discovery and the supported methodology.

The Modeling Structure as shown in FIG. 3 details the structure used to build relationships between the database elements and collected data, from which the phase 2 Correlators build application models. The description of the Modeling process and data structure is in the section describing FIG. 3.

Visualizers 29

Visualizers access the XML data model and extract data in XML format to display the data to users in a format both appropriate for their role and in context.

Service Modeler's user interface: The Visualizer uses the XML data models created by the Collectors and Correlators to populate topology and application views. In addition, it generates reporting and information portals for users and business managers, enabling a detailed understanding of the IT applications and their role in supporting the business.

All data from the Service Modeler system is accessible via a standardized XML API specification, Visualizers use the API to produce user oriented outputs from the system.

XML output from the Service Modeler database will include XML Application topology definitions detailing the IT elements that make each application and the relationships between them from both a connectivity and business perspective. This combined with the attributes of the data elements which detail the configuration and status of each element can provide all of the resources required to produce a wide range of user oriented outputs.

To gather a specific type of data required for a new report a Correlator/Collector pair can be configured to gather that specific data and add it to the data model for reporting against by Visualizers.

Figure 4:
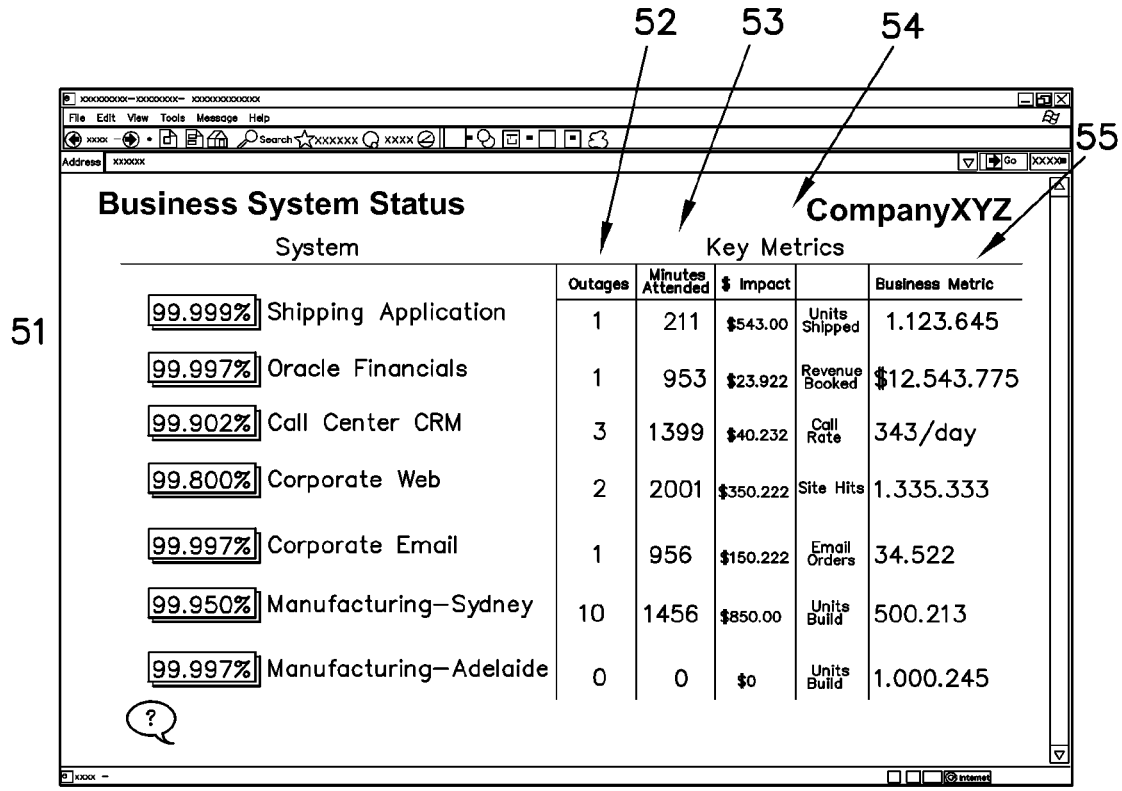
FIG. 4 visualizer example screen—Business System Status Screen

FIG. 4 shows an example of application status reports, where the overall status of each application is display integrated with the percentage availability 51 of the application from a service perspective. In the column to the right details of outages 52, 53 are combined with the financial impact of the outage as calculated base on staff and revenue generating service impact. The last columns show a business KPI against which the applications performance can be monitored from a non IT perspective, i.e. the number of units shipped or helpdesk call a day etc.

Figure 5:
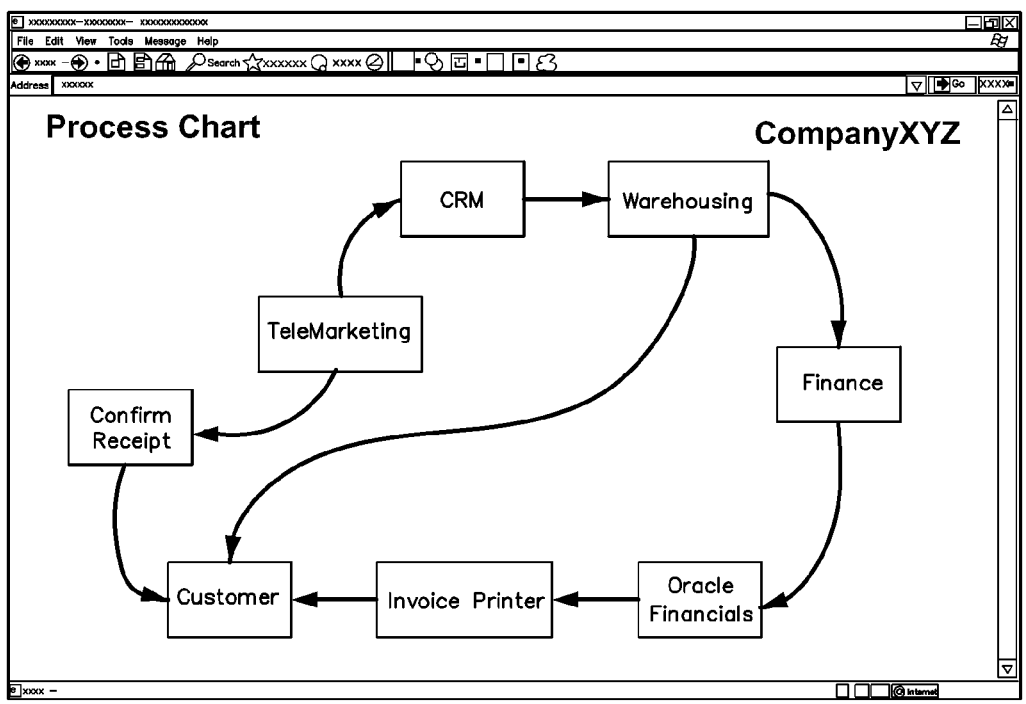
FIG. 5 visualizer example screen—Process Impact Screen

FIG. 5 shows a series of application models mapped against process, detailing the relationship between a series of application and the delivery of business services. This view allows managers to see the impact of an application failure on a service delivery, i.e. in the example above the CRM system is impacting the sale of telesales products as the telemarketers do not know who to call.

Figure 6:
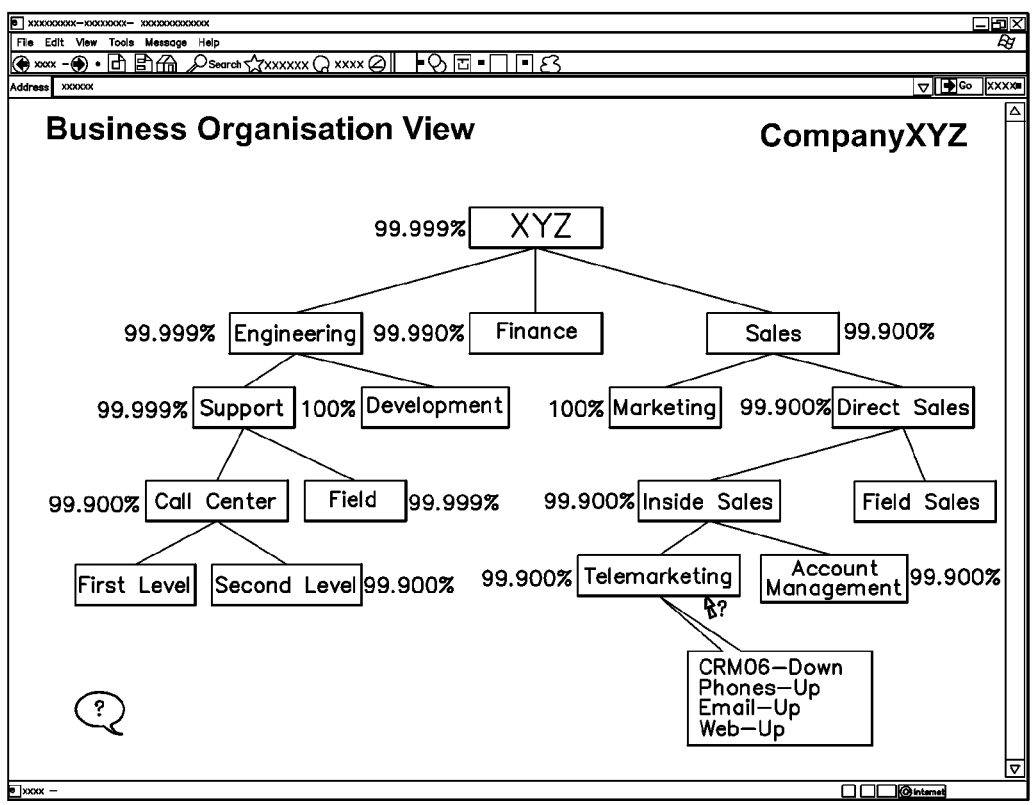
FIG. 6 visualizer example screen—Business Impact Screen

FIG. 6 shows the structure of a business and the service status of the various departments, in this case showing the same CRM fault as the previous example and its impact on both the sales department and the call centre. The call centre is impacted as the volume of calls has fallen below the KPI for that time of day, whilst Telemarketing is unable to access a key business resource, CRM, which prevents them making calls.

Principal Concepts in the Methodology

Common Data Format

The ability to convert data collected by Collectors and transform it into a common data format allows the application discovery methodology to only deal with one type of data internally. The data model structure within the modeling database allows for the pieces of data from the different sources to be part of the whole. That is if a model is made up of data from a series of sources, a, b & c, the resulting model can be a+b+c with any of these components being able to be updated by new data without affecting the others.

For the purpose of the preferred embodiment XML has been chosen with each data source adding a series of tags to the XML definition of the data object. XML could be replaced by other technologies without affecting the methodologies validity.

Policy Definition

The principal prohibiting factor in the modeling of IT applications is that to do so manually requires an inordinate amount of information on the application and the IT infrastructure supporting it. The difficulty in firstly obtaining this data and then actually programming it manually into systems makes manually building anything but the most basic application models in practice impossible.

The application discovery methodology disclosed utilizes policies to broadly specify the criteria that make up an application in an environment rather than specific details. The architecture of collectors, a common data format and Correlators that sort the collected data based on these policies, allows the methodology to build models of application without the need to understand the individual detail of each component. Furthermore this mechanism allows for ongoing auto discovery and maintenance of the application model. The concept of policies is unique to this methodology and enables application discovery to be viable as most businesses currently only have a broad outline to start from of what makes up their application.

Application Models

Application models are virtual constructs, built from the data objects within the data modeling database in the preferred embodiment of the methodology. As the data models are built from the various Collector data sources by the Phase 1 Correlators, accurate and near real-time representations of the IT elements in the real world are constructed. This includes users and the business elements.

Phase two Correlators sort these data models, based on the policies configured into the system and from these build relationships between models that in turn builds the application models. In the preferred embodiment this is achieved by adding tags to the XML definitions of each data object that specify its relationship to other objects. The application map can be displayed by picking any object and following its relationships to other objects by either a connectivity or business relationship. In addition a master application definition can be created, that will use a similar XML format to list all of the objects in a given application model and the relationships between them. This file is optional in the architecture.

Application Auto-Discovery

The collection of data by Collectors, its initial correlation into the data model and subsequent correlation into application models is a dynamic process, Collectors are continually looking for and adding data to the data models, this can be real time or scheduled depending on the data type and administrative requirements of the system.

Correlators recursively search the data store for correlations continually improving the data and application models. Additionally the publish and subscribe mechanism allows for new data to be published such that subscribing Correlators can proactively be made aware of additions to the data models and from that, update the application models as required to incorporate this data.

This process can include the continuous addition of additional Collector data sources and matching Correlators, which can add new resolution to existing data models. Based on this data the application models will be refined to be more accurate providing the mechanism to tune models as more information becomes available for incorporation.

As such the preferred embodiment is a near real-time system that is continually building and maintaining the models.

IT vs. Non-IT Data Sources

The application discovery and modeling methodology supports the ability to mix different types of data to create a detailed view of the structure and health of an application. An Example of this is using HR and company structure data to map the role of applications and IT infrastructure in supporting the business. If software inventory data is used to locate all end systems using a particular application, the Correlator, can then compare the end systems name to LDAP entries to determine which end users use this application. Once the end user names are known this can be compared against traditionally non-IT data such as HR and organizational data, such as who reports to whom in the business to map the applications used not only by user but by office, site and business unit. An IT infrastructure incident that affects the availability of these end user systems can then be mapped not only from an IT perspective but from the impact on the business as a whole down to individual users.

Business Structure Modeling

The modeling of business structure uses the above non-IT data sources to build not only connectivity based models of the business and applications, but also the business structure and the role of applications in supporting the business as shown in FIG. 6. This ability to view and maintain models of the business and its use of modeled application is a powerful feature of the preferred embodiment of the invention.

Business Application Impact

Combining business structure data with non-IT financial data on the cost of personnel resources and the expected productivity or revenue from an individual or group will allow the cost of the failure to be calculated in real terms. i.e. 1000 affected users who cost on average $500 per day multiplied by the percentage of time they are affected multiplied by the percentage of impact on their ability to be productive will give the cost in salaries from an outage. A similar calculation can be performed on the revenue the staff should have been earning thereby providing a figure for productivity losses.

The methodologies ability to maintain an accurate map of applications down to an individual user level and integrate external data sources provides a powerful mechanism for not only modeling applications but providing realistic monitoring of service and application delivery and its impact on business activities.

Business Process Modeling

The mapping of business processes is another perspective of the role of applications in supporting the business, where the application models are mapped against the production process flow of users or business units as shown in FIG. 5.

This creates a third set of relationships that define the dependences of applications upon one another for personnel to do their job. The example in FIG. 5 is Telemarketing sales, where staff needs a series of systems to function; these include phone systems, CRM, finance systems and warehousing. In the example CRM is impacted and because of this the telemarketing process is impacted as the phone operators are unable to access customer details to make calls. The failure can have a flow on effects by reducing the number of units shipped from the warehouse and reducing the number of invoices generated by finance. This model type enables the impact of a failure in one system to be rationalized against KPI impacts in other areas.

This is a separate and optional series of relationship that can be added as tags in the XML data models separate to business and connectivity relationships. Given the nature of this relationship, this data can be added via a Graphical User Interface (GUI) where the process chart would be drawn manually using data objects from the data store.

The Role of Third Party Systems

The preferred embodiment and methodology has been designed to work closely with other third party systems. This allows for the methodology and a subset of the preferred embodiment to be built as extensions to other technologies, using the components of their systems rather than duplicating functionality. An example of this would be to use SMARTS InCharge available from Systems Management ARTS Inc of White Plains, N.Y., as a source of data for topology modeling and root-cause analysis whilst the resulting alternate embodiment of the methodology would add the application models and business structure to the solution.

Data Modeling Architecture and Hierarchy

The Model Hierarchy is the rules and building blocks used by the Methodology to store and manipulate Application Modeling data. In the case of the preferred embodiment of the invention this model is based on XML, although any other compatible modeling language can be used to build the model. This modeling can be run both in memory and in a data store. In the preferred embodiment it is proposed that the real-time data modeling will be run in RAM, with the data stored periodically to a disk based data store. This is expected to provide significant performance advantages.

The basis for the construction of Application Models is the IT Element. Within these IT Elements the relationships are defined that make up the application, business and process models. The format for sorting this data is the XML document form is described in FIG. 7

All components of an application are IT Elements and that IT Elements are not just hardware or software devices. IT Elements include users and customers, where instead of describing port and interfaces, the description would be name, email, role, location, usual workstation, applications used etc.

XML Data Model Description

Figure 7:
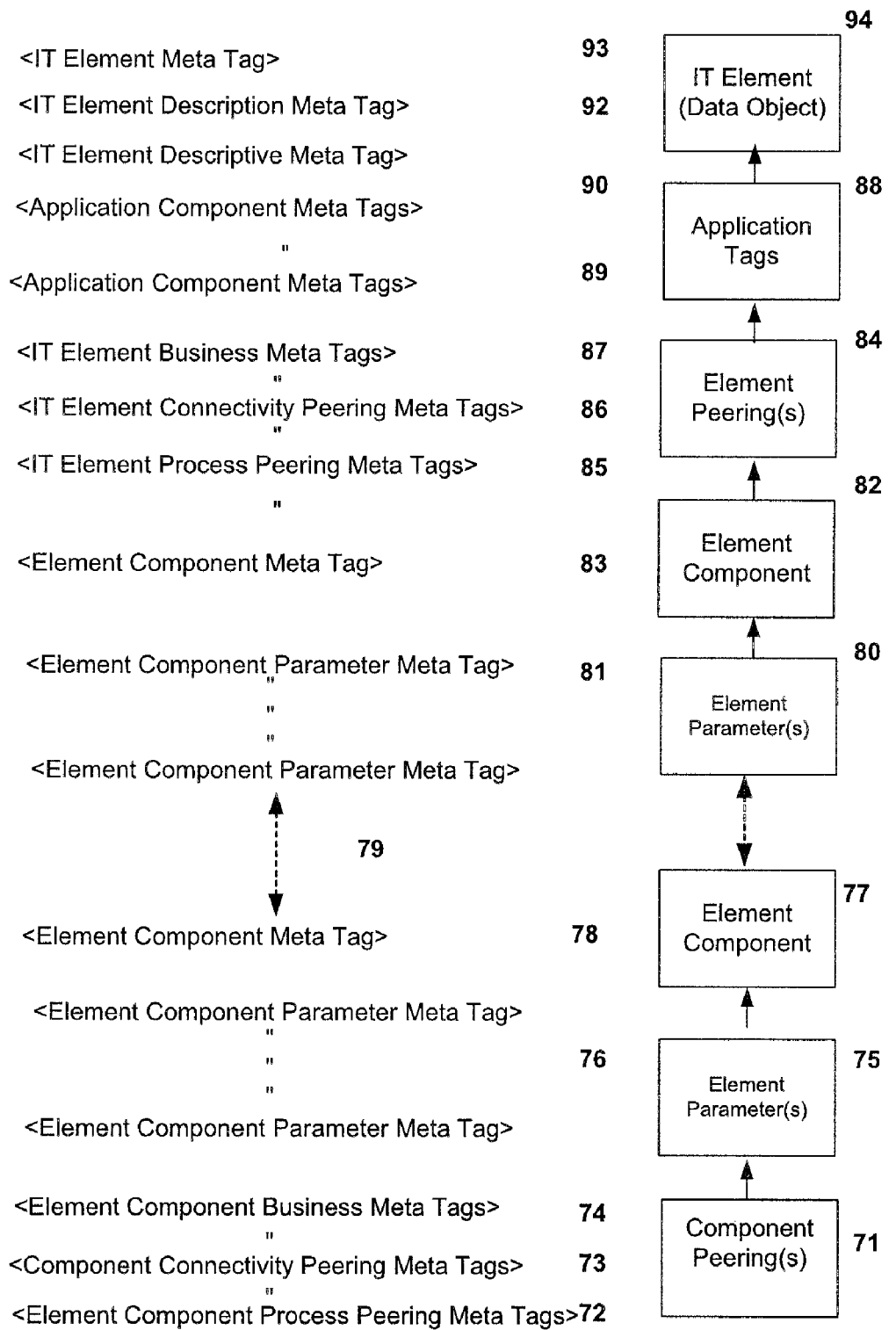
FIG. 7 IT Element XML Document Format Summary

The XML hierarchy described in FIG. 7 is the preferred embodiment of the present invention based on XML. The language technology can be replaced with any other suitable language (.i.e. SQL) whilst utilizing a compatible schema and maintaining compliance to the methodology.

The XML document format describes the data layout required to build XML models of IT Elements (91) from which phase 2 Correlators build Application Models. Application models are collections of IT Elements where the Element Peerings (84) define the relationships between IT Elements at an Application level and Components Peerings (71) define the relationships between Element Components (77) at a more physical level.

The building blocks for IT Elements (91) are Element Components (77). Element Components are series of data added to the XML by phase 1 Correlators. This data is collected by Collectors. Each Element Component (77) is described by a series of Element Parameters (75) which contain descriptive information (81) about the Component and it status. The Component Peerings (72,73,74) describe both internal IT Element relationships and relationships to Element Components within other IT Elements. An example of this is where an Element Component that represents a network interface would have a Component Peering to an Element Component within another IT Element representing a Switch. This type of relationship enables physical connectivity models to be built using the Component Connectivity Peering (73). The other Component Peerings allow the construction of Process (72) and Business Relationship (74) models.

As new data is added to a model by the phase 1 Correlators, the model can be extended dynamically to cope with new data types. Phase 2 Correlators look for specific Meta Tags in the models making the system highly extensible.

Element Peerings (84) have the same roles as Component Peerings 71 for building Application Connectivity (86), Business (87) and Process Models (85), these describe relationships and connectivity at a higher level between IT Elements, as opposed to the more physical connectivity of the Component Peerings (71).

Application Tags (88) are added by Phase 2 Correlators to signify an IT Elements membership of Application Model. An IT Element can be a member of multiple application models with a tags added for each one (89,90). To determine which Business Application a particular IT Element supports, the Visualizer can query these tags to gather the information.

The IT Element Descriptive Tag (82) is used as a summary of the IT Element, i.e. with Windows 2000 Workstation, this can be populated by Phase 1 or 2 Correlators and would use data collected by Collectors.

The Element Meta Tag (83) is a unique identifier for the IT Element as a whole. This can most likely take the form of a number. This data Model is highly extensible and allows for any data to be added at any time, as new Collector/Correlator pairs are added, the content of the XML data Model can be adapted to support that data.

Information on the role of any component is available from this one form, including applications it supports, and its connectivity, business and process relationships with other IT elements.

The Application Modeling Hierarchy is the model structure for creating the application models in the Methodology. As described in the XML data model application models are built from IT Elements and IT Elements contain the relationship data to build the models within their structure.

Figure 8:
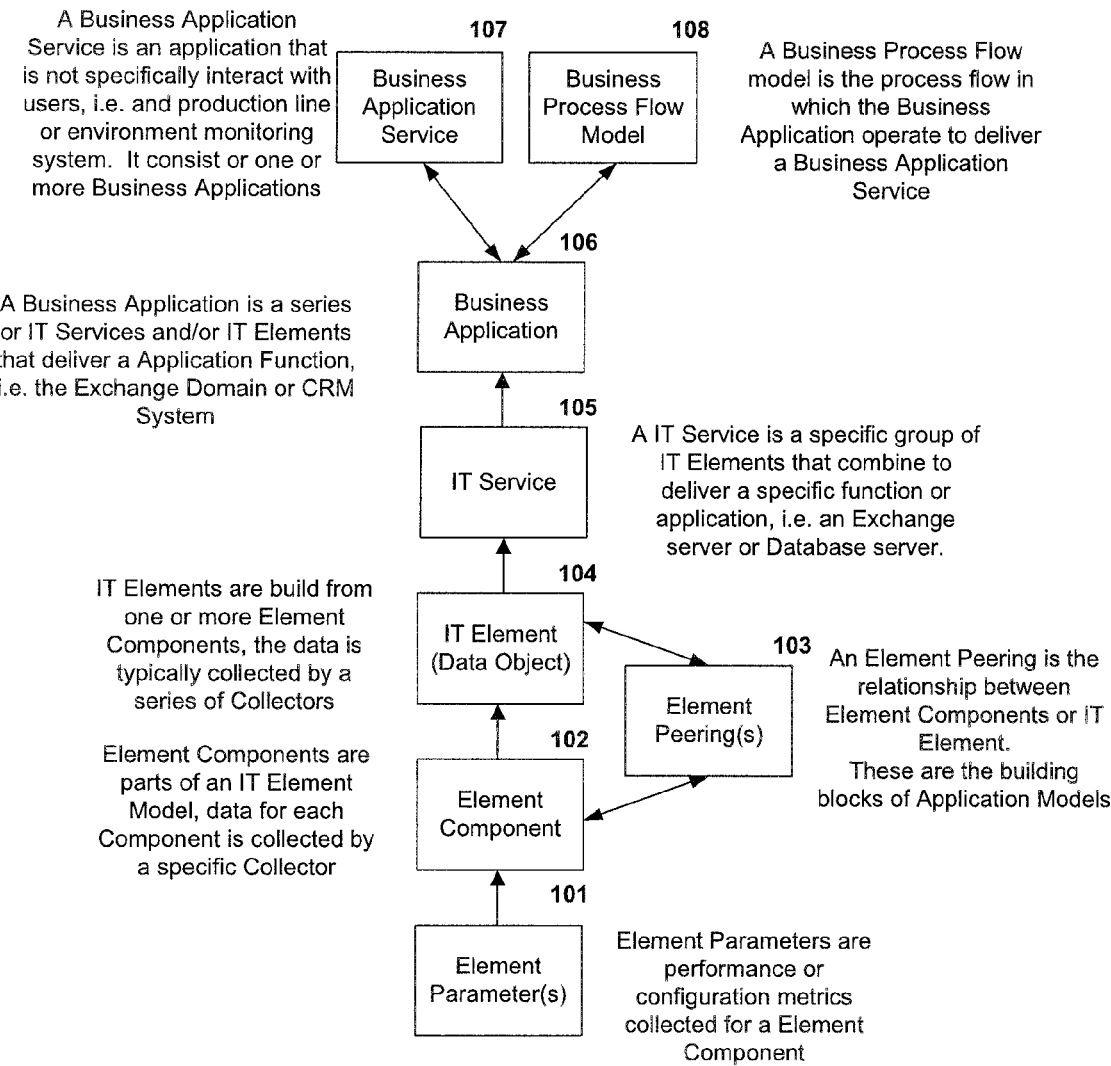
FIG. 8 application Model Hierarchy Diagram

In FIG. 8, the Element Parameters (101), Element Components (102), Element Peerings (103) and IT Elements (104) are as per the XML Document description of FIG. 7.

As phase 2 Correlators apply their policies to sort data in the model they create Element Peering (84 of FIG. 7) and Component Peering 71 relationships. These describe connectivity and business relationships (FIG. 8), and which IT Elements 104 make up IT Services 105 and Business Applications 106.

IT Services are collections of a series of IT Elements that form a component of a business application. This, for example, may be an email server in one office. The IT elements involved in creating the IT Service would be the hosts running the mail server processes, their components and the processes that provide the email service. This may or may not be the Business Application 106 as a whole. If this is a distributed application then the Business application would be the combination of all email IT Services from each state and the infrastructure interconnecting them.

The Business Application 106 is made up of one or more IT Services. These are defined as the applications which are used by end users or that make up a Business Application Service 107.

Business Application Services 107 are applications that run business systems but are not directly end user facing. An example may be an environmental monitoring system or automated applications such as manufacturing systems.

Business Process Flow Models 108 are the process relationships between IT Elements that define how and application or series of applications are used to deliver business services. In the case of the Application Model Hierarchy, this is from a non user interactive point of view.

Figure 9:
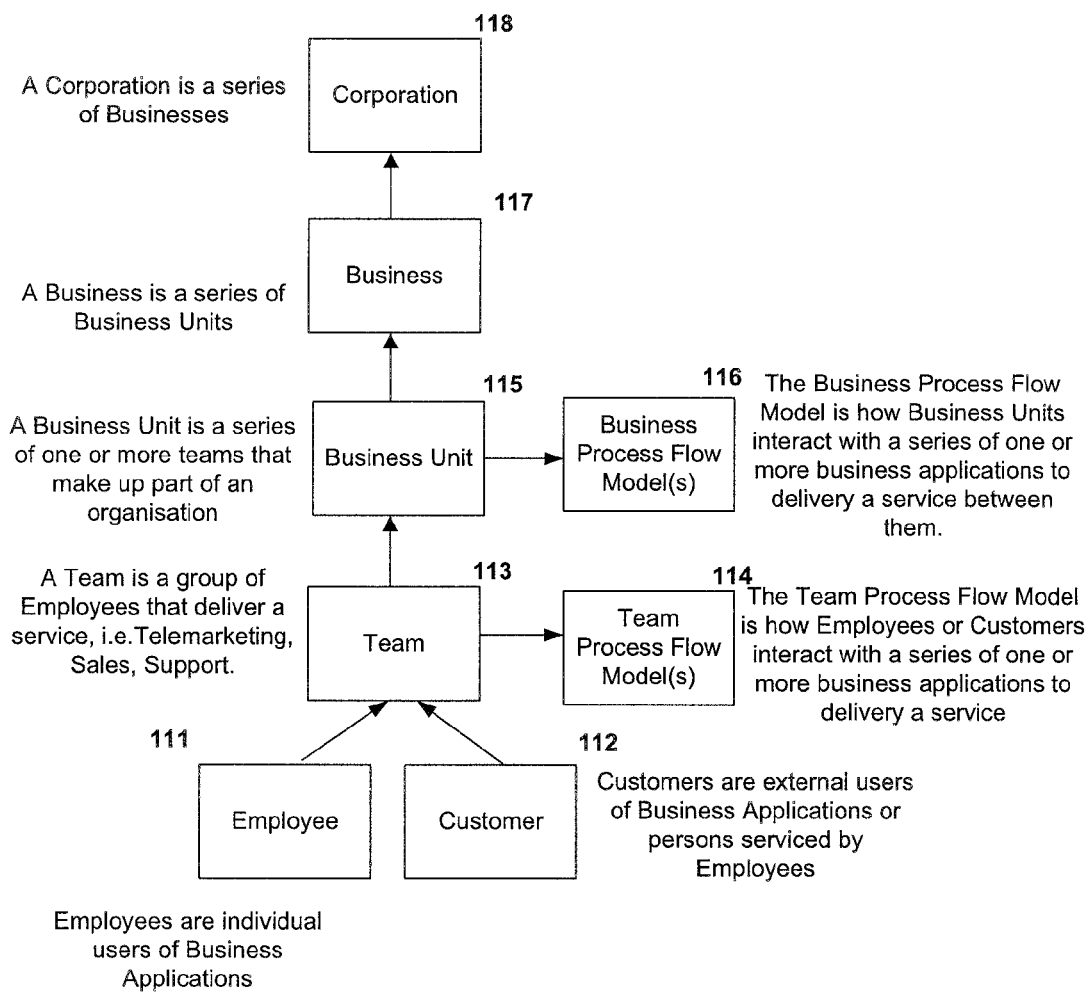
FIG. 9 business Modeling Hierarchy Diagram

Turning to FIG. 9, the Business Modeling hierarchy defines the relationship between employees 111, customers 112 and the corporate structure. This includes where allocations are used and by whom.

Key to this model is the concept that customers and employees are IT Elements and are built the same way at any other IT Element. Relationships and connectivity parameters map to which Team(s) 113 the employee is a member of, there relationship to customers 112 and which application they use.

Teams are groups of Employees, customers, or people who use Business Applications to conduct business, hence the failure of an application can be mapped to the users (Employee 111 or Customer 112) and the Teams that are affected.

At a team level, Team Process Flows 114 detail the combination of applications the team uses and the process of use. i.e. The Telemarketer employee will use the CRM to get customer details, then use the phone system to call the customers storing records in the CRM and adding orders to the ERP system for automated shipping from the warehouse using a Business Application Service.

Business Units 115 are made up of Teams, i.e. Sales, Telemarketing would be the Sales Business Unit, whilst Warehousing and Technical Support may be Business Units in their own right. Business process flow models 116 define the interaction between the Business Units to run the Business 117. The Business 117 is a Series of Business Units, whilst a Corporation 118 is a Series of Businesses.

Key to this model is that the larger entities such as the Business Unit 115, Business (117) and Corporation (118) are made up of the smaller units of Employees (111), Customer (112) and Teams (113). These relationships make the sum of the employees, customer and teams equal to the whole of the Business and the Corporation the sum of the Businesses.

If a series of Employees 111 (IT Elements) is impacted by a failure this will translate to impact on team 113, Business Units 115 and Businesses 117 in terms of productivity and service availability. Combined with an understanding of the process of service delivery and hence the impact of an application on a failure to deliver services, makes it possible to calculate in financial terms the cost of a failure to the business in terms of employee costs and service delivery.

Figure 10:
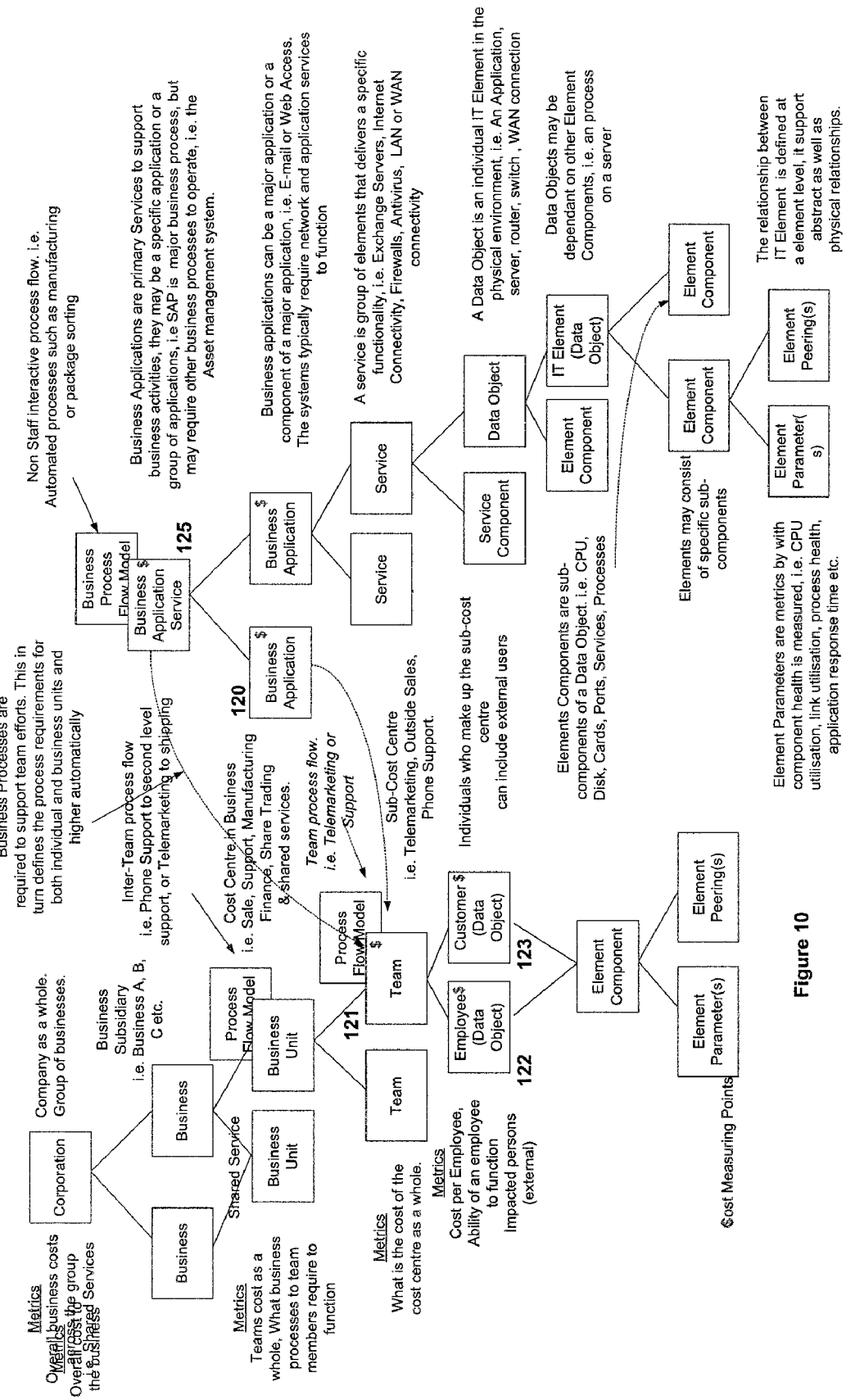
FIG. 10 illustrates the Database modeling structure for building integrated models of Business application and servers and the business hierarchy and structure.
Figure 10A:
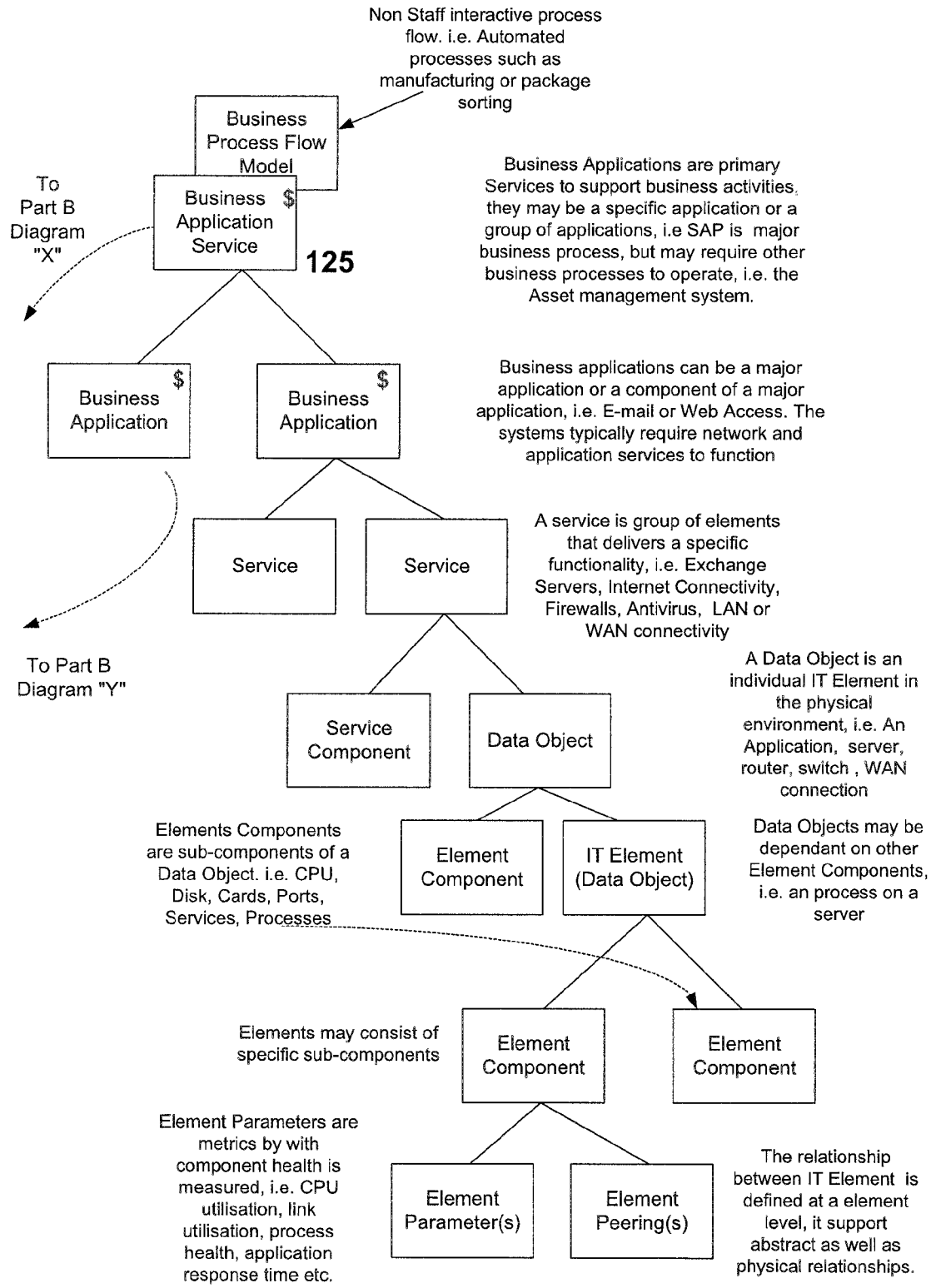
FIG. 10A illustrates part of the database modeling structure of FIG. 10.
Figure 10B:
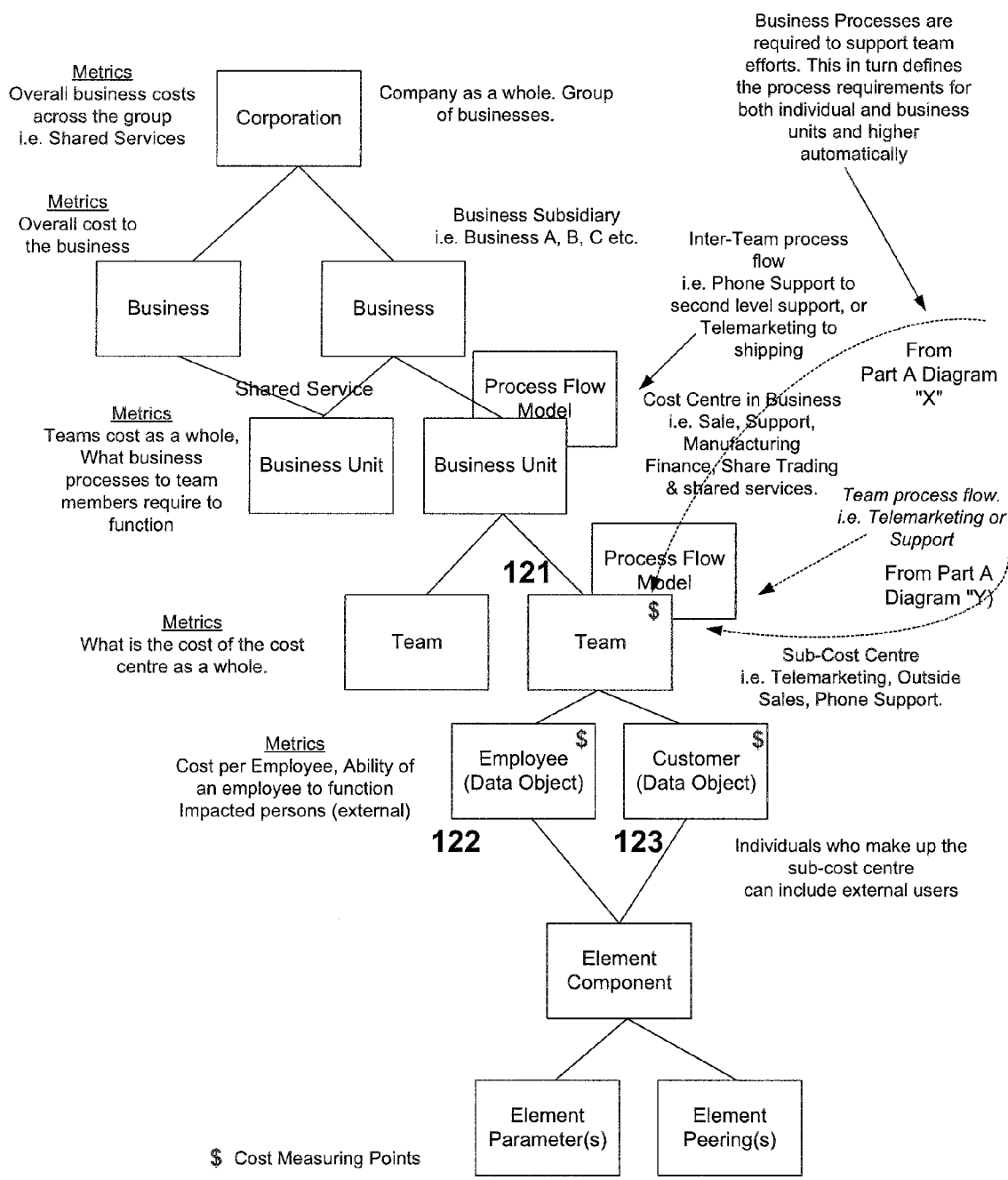
FIG. 10B illustrates part of the database modeling structure of FIG. 10.

FIG. 10 details the relationship point between Business Applications 120 and Teams 121 of Employees 122 or Customers 123 in delivering Services. Business Application Services (125) can also be used by Teams, i.e. Automated Warehousing systems. The ($) symbols indicate where costs or revenue can be attributed.

When a failure occurs that affects an application or the users of that application, the impact of that failure will be represented automatically in the data model through the mapping of status information to IT Elements.

If a user is unable to function, i.e. all IT systems are down they would be 100% ineffective, as such their cost (Salary, etc) can be totaled to calculate financial impact per user. The number of users affected and even details of individual users affected is available from the model. If a user relies of 3 business applications (10) to function, i.e. email, CRM and Phone, then the percentage impact may vary based on which service is unavailable. A user losing email may be 10% impacted, whilst a telemarketer without CRM is 80% ineffective and without phones 90% ineffective. This allows for a percentage of their costs to be calculated into the financial impact.

The financial impact of a failure in revenue can be calculated in a similar way. A telemarketer will generate a certain amount per hour, a warehouse will ship a certain amount of stock per hour; from this the model can calculate the revenue impact by multiplying the percentage of impacted time by the average revenue figure.

The incorporation of non-IT data such as boxes shipped from a warehouse, insurance claims lodged, or tickets booked enables validation of these calculations based on real world KPI's.

The forgoing describes preferred forms of the present invention only. Modifications, obvious to those skilled in the art can be made thereto without departing from the scope of the invention.

What is claimed is:

1. A computer-implemented method for automated discovery and modelling of application services, wherein each application service depends on one or more software applications, computer systems and information technology (IT) infrastructure that support those software applications, the method including:

(a) for a given application service, identifying a plurality of policies that describe elements that make up the given application service based on broadly specified criteria to identify, without specifying directly, the elements that make up the given application service in an environment, including software applications upon which the application service depends, the IT infrastructure that supports those software applications, and the users of those software applications, wherein the policies include at least one of the following criteria for a particular software application:

i. PCs having the software application loaded;
ii. servers having the software application loaded;
iii. databases accessed by servers having the software application loaded; users for PCs having the software application loaded;
iv. business units to which users for PCs having the software application loaded are assigned; and
v. network infrastructure that connects together elements described by any of the above policies;

(b) for each policy, identifying a data category, and identifying a collector module for gathering data of that data category;

(c) instructing the identified collector modules to gather data;

(d) processing the gathered data thereby to create/maintain data objects representing elements that describe, in a specific manner, software applications, IT infrastructure that supports those software applications, and the users of those software applications, wherein each object is indicative of its relationship with one or more other objects, wherein the relationships include:

i. relationships in terms of IT infrastructure; and
ii. relationships in terms of business topology;

(e) for each given application service, instructing a plurality of correlator modules to sort and manipulate the data objects based on the policies, thereby to form relationships between software applications upon which the application service depends, IT infrastructure that supports those software applications, and the users of those software applications, thereby to create a model for the application service;

(f) based on the model, automatically building an end-to-end application service map for each given application service; and (g) on the basis of the end-to-end application service map, performing impact prediction analysis in respect of the model, thereby to identify the impact of a failure in respect of an element, in terms of both infrastructure and business impact.

2. A method according to claim 1 wherein relationships in terms of a IT infrastructure are used to form a map in terms of logical and physical connectivity relationships, and relationships in terms of business topology are used to form a map in terms of business topology.

3. A method according to claim 1 wherein policies describe each of the following criteria for a particular application:
PCs having the application loaded;
servers having the application loaded;
databases accessed by servers having the loaded;
users for PCs having the application loaded;
business units to which users for PCs having the application loaded are assigned; and
network infrastructure that connects together elements described by any of the above criteria.

4. A method according to claim 1 wherein the collector modules include a software inventory collector for identifying applications loaded on PCs and/or servers into a common schema.

5. A method according to claim 4 wherein collector modules locate and identify SQL databases accessed utilized by the server process for the relevant applications and populate the data into a common schema.

6. A method according to claim 1 wherein the collector modules include a Lightweight Directory Access Protocol (LDAP) collectors for mapping user, system, and account data to an Extensible Mark-up Language (XML) schema.

7. A method according to claim 1 wherein the collector modules include a SQL collector for mapping data in an SQL database to an Extensible Mark-up Language (XML) schema.

8. A method according to claim 1 wherein the collector modules include a physical network discovery collector for mapping IT infrastructure between identified application endpoints into a common schema.

9. A method according to claim 1 wherein the collector modules include collector module that makes use of traffic probing and analysis when identifying inter-application communication and mapping relationships into a common schema.

10. A method according to claim 1 wherein the collector modules include two or more of the following:
a software inventory collector for identifying applications loaded on PCs and servers;
a software inventory collector that collects inventory data from third parties software inventory systems;
a software inventory collector configured to identify SQL databases accessed by server process users for the relevant application;
a Lightweight Directory Access Protocol (LDAP) collector for mapping user and account data to an Extensible Mark-up Language (XML) schema;
a SQL collector for mapping data in an SQL database to an XML schema;
a physical network discovery collector for mapping network infrastructure between identified application infrastructure endpoints; and
a collector module that transforms data from a business organizational chart into a common data format.

11. A method according to claim 1 wherein the collector modules include a collector module that transforms data from a business organizational chart into a common data format.

12. A method according to claim 1 wherein steps (d) to (g) are performed on an ongoing basis thereby to continually update data objects, models and application maps based on newly gathered data.

13. A method according to claim 1 wherein step (e) includes:
(e1) analysing an aspect of gathered data to determine whether a data object for that particular aspect of data already exists;
(e2) in the case that a data object for that particular aspect of data already exists, updating, and expanding the existing data object on the basis of the gathered aspect of data; and
(e3) in the case that a data object for that particular aspect of data does not already exist, creating a new data object and adding the gathered aspect of data to the new data object.

14. A method according to claim 1 wherein the gathering of data includes reading data in a native data format, and providing output in a standardized data format.

15. A method according to claim 1 wherein the standardized data format is Extensible Mark-up Language (XML).

16. A method according to claim 1 wherein the IT infrastructure includes logical and physical network infrastructure technologies.

17. A method according to claim 1 wherein the financial cost of the impact of a failure is automatically calculated based on individual costs associated with elements represented in the application model, and the impact of a failure upon them.

18. A computer system configured for performing the method of claim 1.

19. A computer system according to claim 18 that is preloaded with a set of policies for a given application service, and is configured for accepting further policies in respect of that application service or another application service.

\* \* \* \* \*